US012760197B2

(12) United States Patent
Aso

(10) Patent No.: US 12,760,197 B2

(45) Date of Patent: Oct. 13, 2026

(54) COATING COMPOSITION AND COATED ARTICLE

(71) Applicant: SHIN-ETSU CHEMICAL CO., LTD., Tokyo (JP)

(72) Inventor: Fumihiro Aso, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 529 days.

(21) Appl. No.: 18/277,143

(22) PCT Filed: Apr. 6, 2021

(86) PCT No.: PCT/JP2021/014614

§ 371 (c)(1),
(2) Date: Aug. 14, 2023

(87) PCT Pub. No.: WO2022/180866

PCT Pub. Date: Sep. 1, 2022

(65) Prior Publication Data

US 2024/0101856 A1 Mar. 28, 2024

(30) Foreign Application Priority Data

Feb. 26, 2021 (JP) ................................. 2021-029372

(51) Int. Cl.

| | |
|---|---|
| ***C09D 133/08*** | (2006.01) |
| ***C08G 77/00*** | (2006.01) |
| ***C09D 7/63*** | (2018.01) |
| ***C09D 7/65*** | (2018.01) |

(52) U.S. Cl.

CPC ............. *C09D 133/08* (2013.01); *C09D 7/63* (2018.01); *C09D 7/65* (2018.01)

(58) Field of Classification Search

CPC ...... C08G 77/70; C08G 77/80; C09D 183/04; C09D 133/08; C09D 7/63

See application file for complete search history.

(56) References Cited

U.S. PATENT DOCUMENTS

2006/0148999 A1 7/2006 Nixon
2021/0189070 A1* 6/2021 Fujimoto ............... C08G 77/14
2024/0409774 A1* 12/2024 Aso ......................... C08L 75/04

FOREIGN PATENT DOCUMENTS

| | | | | |
|---|---|---|---|---|
| JP | 3-197548 A | 8/1991 | | |
| JP | 5-345877 A | 12/1993 | | |
| JP | 11-116683 A | 4/1999 | | |
| JP | 2005-298561 A | 10/2005 | | |
| JP | 2014-58613 A | 4/2014 | | |
| JP | 2016180093 A * | 10/2016 | | |
| JP | 2019-6873 A | 1/2019 | | |
| WO | WO 2012/128223 A1 | 9/2012 | | |
| WO | WO-2020036074 A1 * | 2/2020 | ............... | C09D 5/00 |

OTHER PUBLICATIONS

Q. Wang, et al. Journal of Tribology 136.1 (2014) ("Wang") (Year: 2014).*

International Search Report (PCT/ISA/210) issued in PCT/JP2021/014614, dated Jul. 6, 2021.

Written Opinion of the International Searching Authority (PCT/ISA/237) issued in PCT/JP2021/014614, dated Jul. 6, 2021.

Chinese Office Action and Search Report for Chinese Application No. 202180094641.6, dated Mar. 7, 2024, with English translation.

Extended European Search Report for European Application No. 21927965.0, dated Dec. 17, 2024.

* cited by examiner

*Primary Examiner* — Alexander R Pagano

*Assistant Examiner* — Frank S. Hou

(74) *Attorney, Agent, or Firm* — Birch, Stewart, Kolasch & Birch, LLP

(57) ABSTRACT

According to the present invention, a coating composition which contains (A) a hydrolyzable silyl group-containing acrylic resin, (B) an organopolysiloxane that is represented by average unit formula (I), and (C) a curing catalyst is able to be produced by a simple process. The coating composition forms a cured coating film that has excellent cracking resistance, coating film hardness, chemical resistance, alkali resistance, heat resistance and weather resistance. Formula (I) is:

$$(SiO_{4/2})_a (R^1SiO_{3/2}) (R^1_2SiO_{2/2})_c (R^1_3SiO_{1/2})_d (R^2O_{1/2})_e \quad (I)$$

wherein $R^1$ represents a monovalent hydrocarbon group, and at least one of the $R^1$ moieties represents a substituted or unsubstituted aryl group; $R^2$ represents a hydrogen atom or an alkyl group; a, b, c and d represent numbers that satisfy a=0, 0.5≤b≤0.6, 0.4≤c≤0.5, d=0, and a+b+c+d=1; and e represents a number that satisfies 0<e≤4.

8 Claims, No Drawings

COATING COMPOSITION AND COATED ARTICLE

TECHNICAL FIELD

This invention relates to a coating composition and a coated article. More particularly, it relates to a coating composition comprising an organic resin and an organopolysiloxane and a coated article having a cured coating of the coating composition.

BACKGROUND ART

Coating compositions composed mainly of organopolysiloxane resins are widely used in buildings and structures of the engineering and construction field because of their coating hardness, chemical resistance, heat resistance, and weather resistance.

Despite such advantages, the organopolysiloxane base coating compositions have the shortcomings that the curing speed is low and the coatings have poor crack resistance.

With the aim to overcome these shortcomings, it is known in the art that a composition comprising an organopolysiloxane in admixture with an organic resin such as an alkyd resin, polyester resin, acrylic resin or epoxy resin is used as a coating composition. Patent Document 1 proposes such a coating composition comprising a silyl-containing vinyl polymer, a silanol-containing organopolysiloxane, and an alkoxy-containing organopolysiloxane.

Although this composition is improved in curability and crack resistance, there remains a problem that coating strength, chemical resistance, heat resistance, and weather resistance characteristic of organopolysiloxane resin coatings are degraded.

Patent Documents 2 and 3 disclose the compounding technique of reacting an organic resin with an organosilane or organopolysiloxane. This technique suffers from the problem of general applicability because a synthetic equipment is needed for the compounding of resins.

There is a need for a simple technique capable of deriving the characteristics of both an organopolysiloxane and an organic resin.

PRIOR ART DOCUMENTS

Patent Documents

Patent Document 1: JP-A H03-197548
Patent Document 2: JP-A H11-116683
Patent Document 3: JP-A H05-345877

SUMMARY OF INVENTION

Technical Problem

An object of the invention, which has been made under the above-mentioned circumstances, is to provide a coating composition comprising an organic resin and an organopolysiloxane which is easy to prepare and forms a cured coating having excellent crack resistance, hardness, chemical resistance, alkali resistance, heat resistance and weather resistance.

Solution to Problem

Making extensive investigations to attain the above object, the inventor has found that a coating composition comprising a hydrolyzable silyl group-containing acrylic resin and a specific organopolysiloxane in a specific mixing ratio is curable at normal temperature and cures into a coating meeting the above-mentioned properties including crack resistance.

The invention is predicated on this finding.

The invention is defined below.

1. A coating composition comprising
(A) 100 parts by weight of a hydrolyzable silyl group-containing acrylic resin,
(B) 5 to 50 parts by weight of an organopolysiloxane, and
(C) 0.1 to 50 parts by weight of a curing catalyst,
the organopolysiloxane (B) having the average unit formula (I):

[Chem. 1]

$$(SiO_{4/2})_a(R^1SiO_{3/2})_b(R^1_2SiO_{2/2})_c(R^1_3SiO_{1/2})_d(R^2O_{1/2})_e \qquad (I)$$

wherein $R^1$ is each independently a $C_1$-$C_{12}$ substituted or unsubstituted monovalent hydrocarbon group, at least one $R^1$ being a $C_6$-$C_{12}$ substituted or unsubstituted aryl group, $R^2$ is hydrogen or a $C_1$-$C_6$ alkyl group, a, b, c and d are numbers satisfying $0 \le a < 1$, $0 < b < 1$, $0 < c \le 0.5$, $0 \le d < 1$, and $a+b+c+d=1$, and e is a number satisfying $0 < e \le 4$.

2. The coating composition of 1 wherein in formula (I), the $C_6$-$C_2$ substituted or unsubstituted aryl group accounts for at least 40% of the total number of R.

3. The coating composition of 1 or 2 wherein in formula (I), $R^1$ is each independently a $C_1$-$C_8$ alkyl group, $C_2$-$C_8$ alkenyl group, $C_6$-$C_{10}$ aryl group or $C_7$-$C_{10}$ aralkyl group.

4. The coating composition of 3 wherein in formula (I), $R^1$ is each independently methyl or phenyl.

5. The coating composition of any one of 1 to 4 wherein in formula (I), the $C_1$-$C_6$ alkyl group accounts for at least 50% of the total number of $R^2$.

6. The coating composition of any one of 1 to 5 wherein in formula (I), b and c are numbers satisfying $0.6 \le b+c \le 1$.

7. The coating composition of any one of 1 to 6 wherein in formula (I), a is 0.

8. The coating composition of any one of 1 to 7 wherein in formula (I), d is 0.

9. The coating composition of any one of 1 to 8 wherein the organopolysiloxane (B) has a weight average molecular weight (Mw) of 1,000 to 10,000 as measured by gel permeation chromatography versus polystyrene standards.

10. The coating composition of any one of 1 to 9 wherein the organopolysiloxane (B) has a kinematic viscosity of 50 to 200 $mm^2/s$ at 25° C.

11. The coating composition of any one of 1 to 10 wherein the curing catalyst (C) contains an organotin compound.

12. A cured coating formed from the coating composition of any one of 1 to 10.

13. A coated article comprising a substrate and the cured coating of 12 formed on at least one surface of the substrate directly or via at least one other layer.

Advantageous Effects of Invention

The coating composition of the invention is prepared simply by mixing a hydrolyzable silyl group-containing acrylic resin with a specific organopolysiloxane. Since the composition contains the acrylic resin and the specific organopolysiloxane and/or condensate thereof in a specific ratio, it cures into a coating having excellent hardness, chemical resistance, alkali resistance, heat resistance and weather resistance. It is thus suited for the manufacture of various coated articles.

DESCRIPTION OF EMBODIMENTS

Now the invention is described in detail.

The invention provides a coating composition comprising the following components (A) to (C):

(A) a hydrolyzable silyl group-containing acrylic resin, (B) an organopolysiloxane having the average unit formula (I):

[Chem. 2]

$$(SiO_{4/2})_a(R^1SiO_{3/2})_b(R^1_2SiO_{2/2})_c(R^1_3SiO_{1/2})_d(R^2O_{1/2})_e \quad (I)$$

and (C) a curing catalyst.

(1) (A) Hydrolyzable Silyl Group-Containing Acrylic Resin

Component (A) is a hydrolyzable silyl group-containing acrylic resin, which undergoes hydrolysis and condensation in the presence of airborne moisture and the curing catalyst (C).

As used herein, the "hydrolyzable silyl group" refers to a group which is hydrolyzed to form a silanol group which is, in turn, subjected to dehydration condensation to form a siloxane bond. The hydrolyzable silyl group is not particularly limited as long as it is a silyl group having either one or both of a monovalent hydrolyzable atom in direct bond with a silicon atom (i.e., an atom which reacts with water to create a silanol group) and a monovalent hydrolyzable group in direct bond with a silicon atom (i.e., a group which reacts with water to create a silanol group).

Examples of the hydrolyzable silyl group include halogenated silyl groups such as chlorosilyl and bromosilyl, alkoxysilyl groups such as methoxysilyl, ethoxysilyl, propoxysilyl and butoxysilyl, and arbitrary combinations thereof.

Examples of the hydrolyzable silyl group-containing acrylic resin include polymers comprising monomeric units derived from hydrolyzable silyl group-containing polymerizable unsaturated compounds and monomeric units derived from (meth)acryloyl group-containing compounds (exclusive of hydrolyzable silyl group-containing polymerizable unsaturated compounds).

In one embodiment of the invention, it is preferred from the aspects of storage stability and curability of the coating composition and physical properties of a coating formed therefrom that the monomeric units derived from hydrolyzable silyl group-containing polymerizable unsaturated compounds account for 1 to 50% by weight, more preferably 2 to 30% by weight and the monomeric units derived from (meth)acryloyl group-containing compounds account for 50 to 99% by weight, more preferably 70 to 98% by weight of the overall monomeric units in the hydrolyzable silyl group-containing acrylic resin.

The hydrolyzable silyl group-containing acrylic resin can be prepared by polymerizing a hydrolyzable silyl group-containing polymerizable unsaturated compound with a (meth)acryloyl group-containing compound, for example, by a well-known radical polymerization process using an azo compound or peroxide as an initiator. Also, commercially available products may be used.

As used herein, the (meth)acryloyl group is intended to mean both acryloyl groups and methacryloyl groups, the (meth)acryloxy group is intended to mean both acryloxy groups and methacryloxy groups, and the (meth)acrylic acid is intended to mean both acrylic acid and methacrylic acid.

The monomeric units derived from hydrolyzable silyl group-containing polymerizable unsaturated compounds may include monomeric units derived from polymerizable unsaturated compounds having a hydrolyzable silyl group and a (meth)acryloyl group, for example, (meth)acryloxyalkoxysilanes.

Examples of the hydrolyzable silyl group-containing polymerizable unsaturated compound include vinylalkoxysilanes such as vinyltrimethoxysilane, vinyltriethoxysilane, divinyldimethoxysilane, divinyldiethoxysilane, vinylmethyldimethoxvsilane, vinylmethyldiethoxysilane, and vinyltris(methoxyethoxy)silane; vinylchlorosilanes such as vinyltrichlorosilane, divinyldichlorosilane, and vinylmethyldichlorosilane; (meth)acryloxyalkoxysilanes such as γ-(meth)acryloxypropyltrimethoxysilane, γ-(meth)acryloxypropyltriethoxysilane, β-(meth)acryloxyethyltrimethoxysilane, β-(meth)acryloxyethyltriethoxvsilane, γ-(meth)acryloxypropylmethyldimethoxysilane, γ-(meth)acryloxypropylmethyldiethoxysilane, γ-(meth)acrvloxypropylmethyldipropoxysilane, γ-(meth)acryloxybutvlphenyldimethoxysilane, and γ-(meth)acryloxypropyldiethylmethoxvsilane; and arbitrary combinations thereof.

Examples of the (meth)acryloyl group-containing compound include straight, branched or cyclic alkyl group-containing (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethylhexyl (meth)acrylate, n-octyl (meth)acrylate, lauryl (meth)acrylate, stearyl (meth)acrylate, cyclohexyl (meth)acrylate, isobornyl (meth)acrylate, and tridecyl (meth)acrylate; N-methoxymethyl (meth)acrylamide, N-butoxymethyl (meth)acrylamide, alkoxyalkyl (meth)acrylates such as methoxyethyl (meth)acrylate, methoxypropyl (meth)acrylate, ethoxyethyl (meth)acrylate, and ethoxypropyl (meth)acrylate; alkoxy group-containing (meth)acrylates, e.g., polyalkylene glycol monoalkoxy (meth)acrylates such as polyethylene glycol monomethoxy (meth)acrylate; epoxy group-containing (meth)acrylates such as glycidyl (meth)acrylate and 3,4-epoxycyclohexyl methyl (meth)acrylate; carboxy group-containing (meth)acrylates such as half-ester compounds of acrylic acid, methacrylic acid or hydroxyalkyl (meth)acrylates and acid anhydrides; sulfonic acid group-containing (meth)acrylates such as 2-acrylamide-2-methylpropane sulfonic acid; phosphoric acid group-containing (meth)acrylates such as acid phosphoroxy ethyl (meth)acrylate and phosphoric acid mono-[(2-hydroxyethyl) (meth)acrylic acid] esters; amino group-containing (meth)acrylates such as N,N-dimethylaminoethyl (meth)acrylate, N,N-diethylaminoethyl (meth)acrylate, N,N-dimethylaminopropyl (meth)acrylate, N-t-butylaminoethyl (meth)acrylate, and N,N-dimethylaminobutyl (meth)acrylate; quaternary ammonium salt group-containing (meth)acrylates such as (meth)acryloyloxyethyl trimethylammonium chloride and methacrylic acid dimethylaminoethyl methyl chloride; hydroxyalkyl (meth)acrylates such as 2-hydroxyethyl (meth)acrylate, hydroxypropyl (meth)acrylate, 2,3-dihydroxybutyl (meth)acrylate, 4-hydroxybutyl (meth)acrylate and products of ring-opening polymerization of lactones such as ε-caprolactone with the hydroxyalkyl (meth)acrylates; hydroxy group-containing (meth)acrylates such as mono-ester compounds of polyhydric alcohols such as polyethylene glycol mono(meth)acrylate with acrylic acid or methacrylic acid; fluoroalkyl (meth)acrylates such as hexafluoroisopropyl (meth)acrylate, perfluorooctyl methyl (meth)acrylate, and perfluorooctyl ethyl (meth)acrylate; and arbitrary combinations thereof.

It is preferred from the aspects of curability, weather resistance and coating efficiency that the hydrolyzable silyl group-containing acrylic resin has a weight average molecular weight (Mw) of 1,000 to 100,000, more preferably 2,000 to 80,000 as measured by gel permeation chromatography versus polystyrene standards although the molecular weight is not particularly limited.

It is noted that component (A) may be used alone or in admixture of two or more.

(2) (B) Hydrolyzable Silyl Group-Containing Organopolysiloxane

Component (B) is an organopolysiloxane having the average unit formula (I).

[Chem. 3]

$$(SiO_{4/2})_a (R^1SiO_{3/2})_b (R^1_2SiO_{2/2})_c (R^1_3SiO_{1/2})_d (R^2O_{1/2})_e \quad (I)$$

Herein $R^1$ is each independently a $C_1$-$C_{12}$ substituted or unsubstituted monovalent hydrocarbon group, at least one $R^1$ being a $C_6$-$C_{12}$ substituted or unsubstituted aryl group, $R^2$ is hydrogen or a $C_1$-$C_6$ alkyl group, a, b, c and d are numbers satisfying $0 \le a < 1$, $0 < b < 1$, $0 < c \le 0.5$, $0 \le d < 1$, and $a+b+c+d=1$, and e is a number satisfying $0 < e \le 4$.

The monovalent hydrocarbon group $R^1$ may be straight, branched or cyclic. Examples thereof include $C_1$-$C_{12}$, preferably $C_1$-$C_8$ alkyl groups. $C_2$-$C_{12}$, preferably $C_2$-$C_8$ alkenyl groups, $C_6$-$C_{12}$, preferably $C_6$-$C_{10}$ aryl groups, and $C_7$-$C_{12}$, preferably $C_7$-$C_{10}$ aralkyl groups.

Examples of the $C_1$-$C_{12}$ alkyl group include methyl, ethyl, n-propyl, i-propyl, n-butyl, i-butyl, t-butyl, n-pentyl, n-hexyl, n-heptyl and n-octyl.

Examples of the $C_2$-$C_{12}$ alkenyl group include vinyl and allyl.

Examples of the $C_6$-$C_{12}$ aryl group include phenyl and naphthyl.

Examples of the $C_7$-$C_{12}$ aralkyl group include benzyl and phenylethyl.

In these monovalent hydrocarbon groups, some or all of the carbon-bonded hydrogen atoms may be substituted by halogen such as chlorine, fluorine or bromine, cyano or other substituents. Examples include halogen-substituted hydrocarbon groups such as chloromethyl, bromoethyl, trifluoropropyl, chlorophenyl, and bromophenyl, and cyano-substituted hydrocarbon groups such as cyanoethyl.

Inter alia, $R^1$ is preferably methyl, ethyl, n-propyl, i-propyl, n-butyl, i-butyl, phenyl, benzyl or vinyl, with methyl and phenyl being more preferred.

Notably, at least one $R^1$, preferably at least 40% of the total number of $R^1$ is a $C_6$-$C_{12}$ aryl group, preferably optionally halogenated $C_6$-$C_{12}$ aryl group.

Examples of the $C_1$-$C_6$ alkyl group $R^2$ include methyl, ethyl, n-propyl, i-propyl, n-butyl, i-butyl, t-butyl, and n-hexyl, with methyl and ethyl being preferred.

Herein, the $C_1$-$C_6$ alkyl group preferably accounts for at least 50% based on the total number of $R^2$.

The subscript "a" is a number satisfying $0 \le a < 1$. The range: $0 \le a \le 0.3$ is preferred from the aspect of crack-suppressing effect of a cured product.

The subscript "b" is a number satisfying $0 < b < 1$. The range: $0.2 \le b \le 1$ is preferred from the aspect of mar resistance of a cured product.

The subscript "c" is a number satisfying $0 < c \le 0.5$. The range: $0 < c \le 0.4$ is preferred from the aspects of curability of the composition and hardness of a cured product.

The subscript "d" is a number satisfying $0 \le d < 1$. The range: $0 \le d \le 0.4$ is preferred from the aspects of curability of the composition and hardness of a cured product.

The subscript "e" is a number satisfying $0 < e \le 4$. The range: $0 < e \le 3$ is preferred from the aspects of crack resistance, water resistance and weather resistance of a cured product, and the range is effective for inhibiting condensation reaction of condensable functional groups.

Notably, $a+b+c+d=1$.

Component (B) may be prepared by the method of preparing ordinary organopolysiloxanes, for example, obtained from hydrolytic condensation of a hydrolyzable group-containing silane compound.

The hydrolyzable group-containing silane compound is not particularly limited as long as it is a silane compound containing 1 to 4 hydrolyzable groups such as chloro or alkoxy on silicon atom(s) and having an organic substituent satisfying the above-mentioned conditions.

Examples include tetrachlorosilane, tetramethoxysilane, tetraethoxysilane, tetraisopropoxysilane, tetrabutoxysilane, methyltrichlorosilane, methyltrimethoxysilane, methyltriethoxysilane, methyltriisopropoxysilane, methyltributoxysilane, dimethyldimethoxysilane, dimethyldiethoxysilane, dimethyldiisopropoxysilane, trimethylchlorosilane, trimethylmethoxysilane, trimethylethoxysilane, trimethylisopropoxysilane, ethyltrichlorosilane, ethyltrimethoxysilane, ethyltriethoxysilane, propyltrichlorosilane, propyltrimethoxysilane, propyltriethoxysilane, butyltrichlorosilane, butyltrimethoxysilane, butyltriethoxysilane, hexyltrichlorosilane, hexyltrimethoxysilane, hexyltriethoxysilane, phenyltrichlorosilane, phenyltrimethoxysilane, phenyltriethoxysilane, cyclohexyltrichlorosilane, cyclohexyltrimethoxysilane, cyclohexyltriethoxysilane, propylmethyldichlorosilane, propylmethyldimethoxysilane, propylmethyldiethoxysilane, hexylmethyldichlorosilane, hexylmethyldimethoxysilane, hexylmethyldiethoxysilane, phenylmethyldichlorosilane, phenylmethyldimethoxysilane, phenylmethyldiethoxysilane, diphenyldichlorosilane, diphenyldimethoxysilane, diphenyldiethoxysilane, dimethylphenylchlorosilane, dimethylphenylmethoxysilane, dimethylphenylethoxysilane, and partial hydrolyzates thereof. Inter alia, methoxysilane and ethoxysilane are preferred for ease of operation, ease of distillation of by-products, and availability of reactants.

The silane compound may be used alone or in admixture.

In the practice of hydrolysis, a hydrolytic catalyst may be used. Any well-known hydrolytic catalysts may be used. Catalysts whose aqueous solutions exhibit an acidity corresponding to pH 1 to 7 are preferred, and acidic hydrogen halides, sulfonic acids, carboxylic acids, acidic or weakly acidic inorganic salts, and solid acids such as ion exchange resins are especially preferred.

Examples of the acidic catalysts include hydrogen fluoride, hydrochloric acid, nitric acid, sulfuric acid, methanesulfonic acid, p-toluenesulfonic acid, formic acid, acetic acid, maleic acid, benzoic acid, lactic acid, and cation exchange resins having a sulfonic acid or carboxylic acid group on their surface.

Although the amount of the hydrolytic catalyst used is not particularly limited, the amount is preferably 0.0002 to 0.5 mole per mole of the hydrolyzable silane, in view of promotion of reaction and easy removal of the catalyst at the end of reaction.

Although the ratio of the amount of the hydrolyzable silane to the amount of water needed in hydrolytic condensation reaction is not particularly limited, a ratio of 0.1 to 10 moles of water per mole of the hydrolyzable silane is preferred for preventing the catalyst from deactivation and allowing the reaction to run to a full extent, and from the aspect of easy removal of water at the end of reaction.

Although the temperature during hydrolytic condensation reaction is not particularly limited, a temperature of −10° C. to 150° C. is preferred for enhancing the reaction rate and preventing an organic functional group on the hydrolyzable silane from being decomposed.

Upon hydrolytic condensation, an organic solvent may be used. Examples of the organic solvent used herein include methanol, ethanol, propanol, acetone, methyl ethyl ketone, methyl isobutyl ketone, tetrahydrofuran, toluene and xylene.

Preferably component (B) contains at least 90% by weight of non-volatiles exclusive of the solvent and the like. More volatiles can cause degradation of outer appearance and lowering of mechanical properties due to formation of voids upon curing of the composition.

Although the molecular weight of component (B) is not particularly limited, it preferably has a weight average molecular weight (Mw) of 1,000 to 10,000 as measured by gel permeation chromatography versus polystyrene standards.

Although the viscosity of component (B) is not particularly limited, it preferably has a kinematic viscosity of 50 to 200 $mm^2/s$ as measured at 25° C. by a Cannon-Fenske viscometer according to JIS-Z-8803.

The amount of component (B) blended is 5 to 50 parts by weight, preferably 10 to 40 parts by weight per 100 parts by weight of component (A). If the amount of component (B) is less than the range, a coating film of the resulting composition has insufficient weather resistance and heat resistance. If the amount of component (B) is more than the range, a coating film of the resulting composition has insufficient solvent resistance and alkali resistance.

The organopolysiloxane as component (B) may be a single composition or a mixture of plural compounds of different compositions. It is preferably prepared by mixing a plurality of compounds of different average composition.

(3) Curing Catalyst (C)

Component (C) is a curing catalyst which is not particularly limited as long as it is commonly used in organosiloxane-based coating compositions. Organometallic compounds are preferred, for example, alkoxide compounds, chelate compounds, and ester compounds of metals such as Ti, Al, Zr and Sn, with catalysts containing organotin compounds being especially preferred.

Examples of the metal alkoxide compound include aluminum alkoxides such as aluminum trimethoxide, aluminum triethoxide, aluminum tri-n-propoxide, aluminum tnisopropoxide, aluminum tri-n-butoxide, aluminum triisobutoxide, aluminum tri-s-butoxide, and aluminum tri-t-butoxide; titanium alkoxides such as tetramethyl titanate, tetraethyl titanate, tetra-n-propyl titanate, tetraisopropyl titanate, tetra-n-butyl titanate, tetra-isobutyl titanate, tetra-t-butyl titanate, tetra-n-hexyl titanate, tetraisooctyl titanate, and tetra-n-lauryl titanate; zirconium alkoxides such as tetraethyl zirconate, tetra-n-propyl zirconate, tetraisopropyl zirconate, tetra-n-butyl zirconate, tetra-s-butyl zirconate, tetra-t-butyl zirconate, tetra-n-pentyl zirconate, tetra-t-pentyl zirconate, tetra-t-hexyl zirconate, tetra-n-heptyl zirconate, tetra-n-octyl zirconate, and tetra-n-stearyl zirconate; and dibutyltin dibutoxide.

Examples of the metal chelate compound include aluminum chelate compounds such as aluminum tris(ethyl acetoacetate), aluminum tris(n-propyl acetoacetate), aluminum tris(isopropyl acetoacetate), aluminum tris(n-butyl acetoacetate), aluminum isopropoxybis(ethyl acetoacetate), tris(acetylacetonato) aluminum, tris(propionylacetonato) aluminum, diisopropoxypropionylacetonatoaluminum, acety lacetonate-bis(propionylacetonato)aluminum, monoethylacetoacetate-bis(acetylacetonato)aluminum, acetylacetonatoaluminum-di-s-butylate, methylacetoacetate aluminum-di-s-butylate, aluminum di(methyl acetoacetate)-mono-tert-butylate, aluminum diisopropoxyethyl acetoacetate, and aluminum monoacetylacetonato-bis(ethyl acetoacetate); titanium chelate compounds such as diisopropoxy-bis(ethyl acetoacetate) titanate, diisopropoxy-bis(acetylacetonato)titanate, and di-n-butoxy-bis(acetylacetonato)titanate; zirconium chelate compounds such as tetrakis(acetylacetonato) zirconium, zirconium tetrakis(n-propyl acetoacetate), and zirconium tetrakis(ethyl acetoacetate); and tin chelate compounds, typically tin ester compounds such as dibutyltin diacetate, dibutyltin di(2-ethylhexylate), dibenzyltin di(2-ethylhexylate), dibutyltin dilaurate, dibutyltin diisooctylmaleate, and dibutyltin bis(acetylacetonate). The tin chelate compounds are preferably used in view of chemical resistance of the resulting coating film.

Commercially available products of the tin ester compound may also be used, for example, Neostan U-100, U-130, U-200, U-220H, U-303, U-700, U-810, U-820, and U-830 (Nitto Kasei Co., Ltd.), and BT-120 S (Kaneka Corp.).

While component (C) may be blended in an amount sufficient to cure the composition, the amount is typically 0.1 to 50 parts by weight, preferably 1 to 30 parts by weight per 100 parts by weight of component (A).

The curing catalyst as component (C) may be used alone or in admixture.

(4) Optional Components

The coating composition of the invention may comprise optional additives as long as the benefits of the invention are not impaired.

Exemplary additives include solvents, non-reactive silicone oils, reactive silicone oils, tackifiers such as silane coupling agents, non-reactive high molecular weight resins, fillers, leveling agents, rheology regulators, reactive diluents, non-reactive diluents, surfactants, dispersants, defoamers, dehydrating agents, anti-aging agents, antioxidants, antistatic agents, IR absorbers, UV absorbers, photostabilizers, fluorescent agents, dyes, pigments, flavors, polishing agents, anti-rusting agents, and thixotropic agents. Each of the additives may be used alone or in admixture.

Exemplary pigments include coloring pigments such as titanium oxide, red iron oxide, cyanine coloring pigments, carbon black, and zircon powder; extender pigments such as silica, baryta (barium hydroxide) powder, precipitated barium sulfate, barium carbonate, calcium carbonate, gypsum, clay, white carbon, diatomaceous earth, talc, magnesium carbonate, alumina white, gloss white, and calcium carbonate; zinc phosphate, zinc phosphosilicate, aluminum zinc phosphate, calcium zinc phosphate, calcium phosphate, aluminum pyrophosphate, calcium pyrophosphate, aluminum dihydrogen tripolyphosphate, aluminum metaphosphate, calcium metaphosphate, zinc oxide, zinc phosphomolybdate, aluminum phosphomolybdate, zinc, zinc oxide, zinc molybdate, calcium molybdate, borates, barium metaborate, zinc calcium cyanamide, calcium silicate, and calcium metasilicate; and anti-rusting pigments such as modified silica in the form of porous silica particles having bonded thereto cations of calcium, zinc, cobalt, lead, strontium, and barium, ion exchange silica having cations bonded by ion exchange, aluminum pyrophosphate, and vanadium based compounds such as vanadium pentaoxide, calcium vanadate, and ammonium metavanadate. The pigments may be used alone or in admixture.

In the embodiment of the invention wherein the coating composition contains a pigment, the content of the pigment is preferably 5 to 100 parts by weight, more preferably to 90 parts by weight as solids per 100 parts by weight as total solids of components (A) and (B), in view of weather resistance of a resulting coating film.

(5) Preparation Method

The coating composition of the invention may be obtained by mixing and agitating components (A), (B) and (C) and optional components at normal temperature in any desired order.

Although the viscosity of the coating composition is not particularly limited, the viscosity is preferably up to 100,000 mPa-s, more preferably up to 20,000 mPa-s, as measured at 25° C. by a rotational viscometer when it is taken into account to facilitate molding or coating operation and suppress formation of streaks. The lower limit of viscosity, is preferably at least 10 mPa-s though not critical.

(6) Cured Film of Coating Composition and Coated Article

A cured film and a coated article are obtained by applying the coating composition to an article or substrate and curing the coating.

The coating technique is not particularly limited and any well-known coating techniques, for example, spray coating, roller coating, brush coating, and flow coating may be employed.

Although the coating composition is curable at normal temperature, it may be heated for promoting cure if necessary.

The heating temperature is preferably 40 to 150° C. The heat cured film exhibits excellent weather resistance, heat resistance, and alkali resistance.

Suitable articles or substrates to be coated include glass substrates and metal substrates which have been primarily treated if desired, specifically steel plates, zinc plating, stainless steel, aluminum, alkaline substrates (e.g., concrete, mortar, roofing or other slates), ceramic building members, plastic members, and the foregoing members having an old coating deposited thereon.

The coating composition of the invention finds a typical application as heavy rust-preventing coatings on steel structures such as bridges, electric power pylons, plants, and tanks although its application is not limited thereto.

The coating composition yields a cured film which has excellent long-term weather resistance, and protects by itself the article coated therewith from severe environments and maintains its aesthetic appearance. If necessary, any well-known primary and/or intermediate coating layer may be formed.

Examples of the primary coating include epoxy resin coatings, modified epoxy resin coatings, epoxy resin based glass flake coatings, epoxy resin-coated materials, ultra-thick film epoxy resin coatings, epoxy resin zinc-rich paints, inorganic zinc-rich paints, chloride rubber resin coatings, phthalate resin coatings, and epoxy ester resin coatings. Examples of the intermediate coating include epoxy resin coatings, polyurethane coatings, epoxy resin MIO coatings, phenolic resin MIO coatings, chloride rubber resin coatings, and phthalate resin coatings.

EXAMPLES

Examples and Comparative Examples are given below for further illustrating the invention although the invention is not limited thereto. It is noted that the weight average molecular weight is measured by GPC (gel permeation chromatograph HLC-8220 by Tosoh Corp.) using tetrahydrofuran (THF) as developing solvent; the nonvolatile content is measured by the ignition loss method of heating to dryness on an aluminum dish at 105° C. for 3 hours; the kinematic viscosity is measured at 25° C. by a Cannon-Fenske viscometer. The constitution ratio of siloxane units in the average unit formula of a polysiloxane is calculated from the measurement results of $^1$H- and $^{29}$Si-NMR spectroscopy.

[1] Preparation of Coating Composition

Examples 1-1 to 1-4 and Comparative Examples 1-1 to 1-8

Coating compositions (i) to (xii) were prepared by mixing the following components in the compositional ratio in Table 1.

Component (A)

(A-1): Acrylic resin containing hydrolyzable silyl group (Gemlac YC-5920, Kaneka Corp.)

(A-2): Acrylic resin containing hydrolyzable silyl group (Gemlac YC-3623, Kaneka Corp.)

Component (B)

(B-1): Organopolysiloxane represented by constitutional unit ratio: $(R^1SiO_{3/2})_{0.60}(R^1{}_2SiO_{2/2})_{0.04}$ $(R^2O_{1/2})_{0.24}$ wherein $R^1$ is 43% of phenyl and 57% of methyl and $R^2$ is 73% of methyl and 27% of hydrogen, having a Mw of 1,800, a nonvolatile content of 96% by weight, and a kinematic viscosity of 100 mm$^2$/s (B-2): Organopolysiloxane represented by constitutional unit ratio: $(R^1SiO_{3/2})_{1.00}(R^2O_{1/2})_{0.22}$ wherein $R^1$ is methyl and $R^2$ is 74% of methyl and 26% of hydrogen, having a Mw of 1,800, a nonvolatile content of 94% by weight, and a kinematic viscosity of 25 mm$^2$/s (B-3): Organopolysiloxane represented by constitutional unit ratio: $(SiO_{4/2})_{1.00}(R^2O_{1/2})_{0.26}$ wherein $R^2$ is 90% of methyl and 10% of hydrogen, having a Mw of 1,000, a nonvolatile content of 87% by weight, and a kinematic viscosity of 5 mm$^2$/s (B4): Organopolysiloxane represented by constitutional unit ratio: $(R^1SiO_{3/2})_{0.50}(R^1{}_2SiO_{2/2})_{0.50}(R^2O_{1/2})_{0.19}$ wherein $R^1$ is methyl and $R^2$ is 69% of methyl and 31% of hydrogen, having a Mw of 4,500, a nonvolatile content of 87% by weight, and a kinematic viscosity of 80 mm$^2$/s (B-5): Organopolysiloxane represented by constitutional unit ratio: $(R^1SiO_{3/2})_{0.40}(R^1{}_2SiO_{2/2})_{0.60}(R^2O_{1/2})_{0.19}$ wherein $R^1$ is 38% of phenyl and 62% of methyl and $R^2$ is 12% of methyl and 88% of hydrogen, having a Mw of 2,500, a nonvolatile content of 50% by weight, and a kinematic viscosity of 5 mm$^2$/s Component (C)
Organotin compound curing catalyst (BT-120 S by Kaneka Corp.)

[Solvent]
Mixture of ethyl acetate/butyl acetate=1/1 (weight ratio)

TABLE 1

| | Example | | | | Comparative Example | | | | | | | |
|---|---|---|---|---|---|---|---|---|---|---|---|---|
| | 1-1 | 1-2 | 1-3 | 1-4 | 1-1 | 1-2 | 1-3 | 1-4 | 1-5 | 1-6 | 1-7 | 1-8 |
| Composition | (i) | (ii) | (iii) | (iv) | (v) | (vi) | (vii) | (viii) | (ix) | (x) | (xi) | (xii) |
| (A-1) | 100 | 1.00 | | | 100 | | 100 | 100 | 100 | 100 | 100 | 100 |
| (A-2) | | | 100 | 100 | | 100 | | | | | | |
| (B-1) | 15 | 30 | 30 | 40 | | | 3 | 60 | | | | |
| (B-2) | | | | | | | | | 30 | | | |
| (B-3) | | | | | | | | | | 30 | | |
| (B-4) | | | | | | | | | | | 30 | |
| (B-5) | | | | | | | | | | | | 30 |
| (C) | 10 | 10 | 10 | 10 | 10 | 10 | 10 | 10 | 10 | 10 | 10 | 10 |
| Solvent | 20 | 20 | 20 | 20 | 20 | 20 | 20 | 20 | 20 | 20 | 20 | 20 |

[2] Preparation and Evaluation of Coated Article

Examples 2-1 to 2-4 and Comparative Examples 2-1 to 2-8

Each of the coating compositions (i) to (xii) of Examples 1-1 to 1-4 and Comparative Examples 1-1 to 1-8 was applied onto a metal substrate by flow coating so as to give a dry coating thickness of 30 μm and aged at 23° C. and 50% RH for 7 days to form a coating.

The coated articles were evaluated for coating appearance, rubbing test, pencil hardness, alkaline test, heating test, and accelerated weathering, with the results shown in Table 2.

(1) Coating Appearance

On visual observation, a sample having a uniform coating surface and free of asperities due to agglomerates or cracks is rated acceptable (○) and a sample having a non-uniform coating surface and asperities due to agglomerates and/or cracks is rated unacceptable (x).

(2) Pencil Hardness

Measured under a load of 750 g according to JIS K5600-5-4

(3) Rubbing Test

After the coating surface was rubbed with fabric BEMCOT M-311 (Asahi Kasei Corp., area 4 $cm^2$) immersed in acetone under a load of 500 gf over 30 reciprocal cycles, it was evaluated for appearance by visual observation. A sample whose appearance after the rubbing test is unchanged from before the test is rated acceptable (○) and a sample whose coating is stripped or whitened is rated unacceptable (x).

(4) Alkaline Test

The alkaline test according to JIS K5660-6-2 included the steps of immersing a sample in a saturated solution of calcium hydroxide at 23° C. for 7 days, moderately washing the sample with flowing water, and drying for 2 hours. The coating was visually observed for swell, cracks, stripping, and gloss changes and assigned to the following 3 ratings.

○: no substantial changes from the initial sample

Δ: some gloss clouding as compared with the initial sample x: substantial gloss clouding, cracks and stripping as compared with the initial sample (5) Heating Test In the heating test, a dryer at 200° C. was used. The test included the steps of heating in the dryer at 200° C. for 24 hours and air cooling at room temperature for 2 hours. After the test, the coating was visually observed for swell, cracks, stripping, and gloss changes and assigned to the following 3 ratings.

○: no substantial changes from the initial sample

Δ: some gloss clouding as compared with the initial sample x: substantial gloss clouding, cracks and stripping as compared with the initial sample (6) Accelerated Weather Resistance In the accelerated weathering test, a super-accelerated weathering tester (Eye Super UV tester by Iwasaki Electric Co., Ltd.) was used. The test piece was a polyester-coated steel plate (0.8×70×60 mm). The test included 50 cycles, with one cycle consisting of 4 hours of irradiation (UV intensity 90 mW, black panel temperature 63° C., 70% RH), 4 hours of darkening (black panel temperature 63° C., 70% RH), and 4 hours of dewing (black panel temperature 30° C., 90% RH) to a total of 12 hours. After the test, the coating was visually observed for swell, cracks, stripping, and gloss changes and assigned to the following 3 ratings.

○: no substantial changes from the initial sample

Δ: some gloss clouding as compared with the initial sample x: substantial gloss clouding, cracks and stripping as compared with the initial sample

TABLE 2

| | Example | | | | Comparative Example | | | | | | | |
|---|---|---|---|---|---|---|---|---|---|---|---|---|
| | 2-1 | 2-2 | 2-3 | 2-4 | 2-1 | 2-2 | 2-3 | 2-4 | 2-5 | 2-6 | 2-7 | 2-8 |
| Composition | (i) | (ii) | (iii) | (iv) | (v) | (vi) | (vii) | (viii) | (ix) | (x) | (xi) | (xii) |
| Appearance | ○ | ○ | ○ | ○ | ○ | ○ | ○ | ○ | x | ○ | x | ○ |
| Pencil hardness | 2H | 2H | H | H | 2H | H | 2H | 2B | 2B | 2H | B | B |
| Rubbing test | ○ | ○ | ○ | ○ | ○ | ○ | ○ | x | x | x | x | x |
| Alkaline test | ○ | ○ | ○ | ○ | x | Δ | Δ | x | x | x | x | ○ |
| Heating test | ○ | ○ | ○ | ○ | x | x | Δ | ○ | x | Δ | Δ | ○ |
| Accelerated weather resistance | ○ | ○ | ○ | ○ | x | x | Δ | Δ | x | Δ | Δ | ○ |

As is evident from Table 2, the coatings obtained in Examples 2-1 to 2-4 are excellent in crack resistance, hardness, chemical resistance, alkaline resistance, heat resistance, and weather resistance.

In contrast, the coatings of Comparative Examples 2-1 and 2-2 using organopolysiloxane-free compositions and the coating of Comparative Example 2-3 using a composition containing a short amount of component (B) are insufficient in alkaline resistance, heat resistance, and weather resistance. The coating of Comparative Example 2-4 using a composition containing an excess of component (B) is inferior in hardness, chemical resistance and alkaline resistance. The coatings of Comparative Examples 2-5 to 2-8 using compositions containing organopolysiloxanes other than component (B) show stripping in the rubbing test and are inferior in the coating properties.

The invention claimed is:

1. A coating composition comprising (A) 100 parts by weight of a hydrolyzable silyl group-containing acrylic resin, (B) 5 to 50 parts by weight of an organopolysiloxane, and (C) 0.1 to 50 parts by weight of a curing catalyst, the organopolysiloxane (B) having the average unit formula (I):

$$(SiO_{4/2})_a\ (R^1SiO_{3/2})b(R^{12}SiO_{2/2})c(R^{13}SiO_{1/2})d\ (R^{201/2})e(I)$$

wherein $R^1$ is each independently a $C_1$-$C_{12}$ substituted or unsubstituted monovalent hydrocarbon group, at least one $R^1$ being a $C_6$-$C_{12}$ substituted or unsubstituted aryl group, $R^2$ is hydrogen or a $C_1$-$C_6$ alkyl group, a, b, c and d are numbers satisfying a=0, 0.5≤b≤0.6, 0.4≤c≤0.5, d=0, and a+b+c+d=1, and e is a number satisfying 0<e≤4, and in formula (I), the $C_6$-$C_{12}$ substituted or unsubstituted aryl group accounts for 40% to 43% of the total number of $R^1$.

2. The coating composition of claim 1 wherein in formula (I), $R^1$ is each independently a $C_1$-$C_8$ alkyl group, $C_2$-$C_8$ alkenyl group, $C_6$-$C_{10}$ aryl group or $C_7$-$C_{10}$ aralkyl group.

3. The coating composition of claim 2 wherein in formula (I), $R^1$ is each independently methyl or phenyl.

4. The coating composition of claim 1 wherein in formula (I), the $C_1$-$C_6$ alkyl group accounts for at least 50% of the total number of $R^2$.

5. The coating composition of claim 1 wherein the organopolysiloxane (B) has a weight average molecular weight (Mw) of 1,000 to 10,000 as measured by gel permeation chromatography versus polystyrene standards.

6. The coating composition of claim 1 wherein the curing catalyst (C) contains an organotin compound.

7. A cured coating formed from the coating composition of claim 1.

8. A coated article comprising a substrate and the cured coating of claim 7 formed on at least one surface of the substrate directly or via at least one other layer.

* * * * *